US012560891B2

(12) United States Patent
Hinaux et al.

(10) Patent No.: US 12,560,891 B2
(45) Date of Patent: Feb. 24, 2026

(54) HOROLOGICAL MOVEMENT COMPRISING A STRIKING MECHANISM PROVIDED WITH A FLEXIBLE GUIDE

(71) Applicant: The Swatch Group Research and Development Ltd, Marin (CH)

(72) Inventors: Baptiste Hinaux, Lausanne (CH); Jérôme Favre, Neuchatel (CH); Jonathan Meyer, Bienne (CH)

(73) Assignee: The Swatch Group Research and Development Ltd, Marin (CH)

( * ) Notice: Subject to any disclaimer, the term of this patent is extended or adjusted under 35 U.S.C. 154(b) by 320 days.

(21) Appl. No.: 18/311,336

(22) Filed: May 3, 2023

(65) Prior Publication Data

US 2024/0027969 A1 Jan. 25, 2024

(30) Foreign Application Priority Data

Jul. 20, 2022 (EP) .................................... 22185892

(51) Int. Cl.
*G04B 21/06* (2006.01)

(52) U.S. Cl.
CPC .................................... *G04B 21/06* (2013.01)

(58) Field of Classification Search
CPC ........ G04B 21/06; G04B 21/02; G10D 13/08; F16C 11/12
See application file for complete search history.

(56) References Cited

U.S. PATENT DOCUMENTS

| | | | | |
|---|---|---|---|---|
| 1,025,821 | A | 5/1912 | Mcgraw | |
| 2016/0320753 | A1* | 11/2016 | Bossart | G04B 17/066 |
| 2019/0025761 | A1* | 1/2019 | Chabloz | G04B 13/00 |
| 2022/0197218 | A1* | 6/2022 | Kahrobaiyan | G04B 17/045 |
| 2023/0136065 | A1* | 5/2023 | Bucaille | G04B 17/227 368/175 |

FOREIGN PATENT DOCUMENTS

| | | | |
|---|---|---|---|
| CH | 715 617 | A2 | 6/2020 |
| CH | 719059 | * | 10/2021 |
| DE | 14083 | C | 10/1880 |

OTHER PUBLICATIONS

European Search Report issued Oct. 26, 2022 in European Application 22185892.1 filed on Jul. 20, 2022, 3 pages (with English Translation of Categories of Cited Documents).

* cited by examiner

*Primary Examiner* — Sean Kayes
(74) *Attorney, Agent, or Firm* — Oblon, McClelland, Maier & Neustadt, L.L.P.

(57) ABSTRACT

The invention relates to a horological movement comprising a striking mechanism of a watch including a vibrating element and a striking device of said vibrating element comprising a hammer fixed overhanging a structure of the horological movement by means of strips of a flexible guide, said strips being both arranged so as to extend in directions intersecting at a point materialising an instantaneous centre of rotation C disposed along an axis T tangent to the vibrating element.

10 Claims, 1 Drawing Sheet

HOROLOGICAL MOVEMENT COMPRISING A STRIKING MECHANISM PROVIDED WITH A FLEXIBLE GUIDE

CROSS-REFERENCE TO RELATED APPLICATIONS

This application claims the benefit of priority from prior European Application No. 22185892.1 filed Jul. 20, 2022, the entire contents of which is incorporated herein by reference.

TECHNICAL FIELD OF THE INVENTION

The invention falls within the field of horological movement complications, and particularly striking mechanisms of a watch.

More particularly, the invention relates to a horological movement comprising a striking mechanism provided with a flexible guide.

Such a striking mechanism can be adapted to any type of striking, such as a repetition of quarters, minutes, a grand strike, a small strike or an alarm.

TECHNOLOGICAL BACKGROUND

Watch striking-mechanisms are known to include a hammer intended to strike a vibrating element, such as a gong.

In particular, the hammer is constrained in movement towards the vibrating element by a spring and is wound, that is to say held at a distance from the gong, by an activation mechanism, such as a pallet or another dedicated mechanism.

Generally, the vibrating element extends in a curvilinear direction in the watch case, for example about a central axis of said case. During the impact of the hammer on the vibrating element, the hammer generates forces on the vibrating element causing its vibration and consequently, the sound of the striking mechanism. These forces include a normal component and a tangential component, the latter characterising the frictions of the hammer on the vibrating element.

In particular, the vibration of the vibrating element is essentially generated by the normal component of the forces applied by the hammer, hence the need to control and maximise this normal component to control the effectiveness of the impact of the hammer on the vibrating element and the sound produced by this impact.

SUMMARY OF THE INVENTION

The invention resolves the aforementioned drawbacks by proposing, to this end, a horological movement comprising a striking mechanism of a watch comprising a vibrating element and a striking device of said vibrating element. The striking device comprises a hammer fixed overhanging a structure of the horological movement by means of at least two elastic strips forming a flexible guide. The two strips are both arranged so as to extend in directions intersecting at a point C disposed along an axis T tangent to the vibrating element at a point intended to be subjected to the impact of the hammer, the hammer being driven in movement in a direction D perpendicular to the axis T, or in a direction tangent to a direction D perpendicular to the axis T.

In particular embodiments, the invention can further include one or more of the following features, taken singly or according to any combination technically possible.

In particular embodiments, the striking device includes at least one elastic strip arranged so that the direction in which it extends does not pass through the point C.

In particular embodiments, the striking device includes strips arranged so as to form a plurality of groups of strips in each of which the strips extend in directions intersecting at an intersection point along the axis T, said intersection points of the directions of the strips of each group being different from one another.

In particular embodiments, the striking device is fixed to the structure of the horological movement only by a mechanical connection of the setting type.

In particular embodiments, at least the strips are made of silicon, by deep reactive ion etching.

In particular embodiments, at least the strips are made by laser machining, in particular by femtosecond laser, or by electroerosion.

In particular embodiments, the striking device is one piece.

In particular embodiments, the striking device is made of amorphous metal, by moulding or hot forming.

In particular embodiments, the striking device is made of nickel or of phosphorus nickel, by a LIGA method.

In particular embodiments, the strips have a thickness thinner than that of the hammer.

BRIEF DESCRIPTION OF THE FIGURES

Other features and advantages of the invention will become apparent upon reading the following detailed description given by way of a non-limiting example, and with reference to the accompanying drawings, wherein.

It should be noted that the figures are not necessarily drawn to scale for clarity purposes.

DETAILED DESCRIPTION OF THE INVENTION

Figure 1:
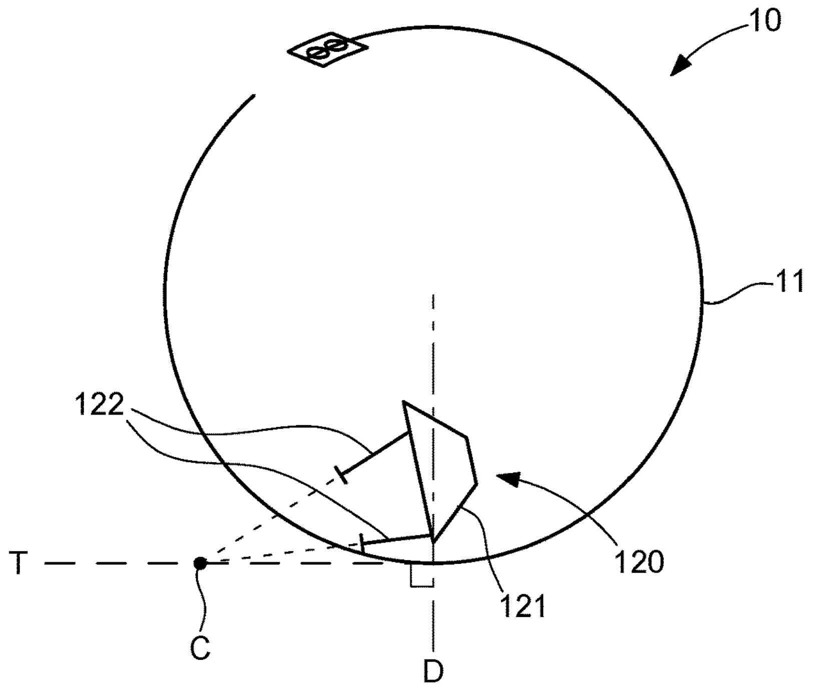
FIG. 1 schematically shows a top view of a striking mechanism comprising a striking device in a rest state, according to a preferred example of embodiment of the invention.

FIG. 1 shows a striking mechanism 10 of a horological movement in a watch in a preferred example of embodiment of the invention.

The striking mechanism 10 comprises a vibrating element 11 and a striking device 120 intended to strike said vibrating element 11 in order to cause the production of a sound. The vibrating element 11 is fixed to a structure of the horological movement, for example to a bar, to a plate, etc., and is, in the example of embodiment shown in FIG. 1, formed by a gong.

The striking device 120 comprises a hammer 121 fixed overhanging the structure of the horological movement by means of a plurality of strips 122 forming a flexible guide. The strips 122 have a capacity to elastically deform and are used in the present invention for guiding and driving the hammer 121. There are preferably two strips 122. In particular, each strip 122 has a straight shape when the striking device 120 is in a rest state, that is to say in a balance position. The flexible guide formed by the strips 122 is of the Remote Centre Compliance (RCC) type.

In a manner known per se by the person skilled in the art, in short, the striking device 120 is wound by an activation mechanism (not shown in the figures), such as a pallet or any other dedicated mechanism, that is to say that the hammer 121 is driven at a distance from the vibrating element 11, so as to force the strips 122 to progressively deform, until reaching a wound state. Subsequently, in response to the passage of a predefined time value of the current time or on instruction of a user, the activation mechanism releases the hammer 121 which is then, under the effect of the elastic return force of the strips 122, percussively driven on the vibrating element 11, the striking device 120 then being in a percussion state.

Advantageously, the strips 122 make it possible to position very accurately the hammer 121 in relation to the structure of the horological movement, and in particular in relation to the vibrating element 11, without mechanical play and without lubrication, as opposed to a conventional horological pivot. Moreover, the strips 122 provide a constant amount of energy to move the hammer 121, during each percussion of the striking device 120 on the vibrating element 11.

Figure 2:
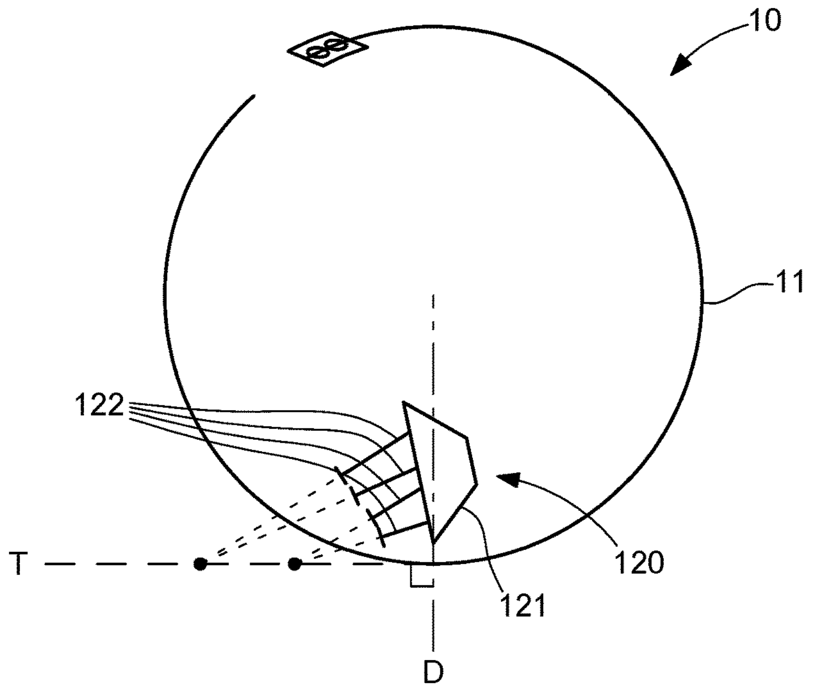
FIG. 2 schematically shows a top view of a striking mechanism comprising a striking device in a rest state, according to another example of embodiment of the invention.
Figure 3:
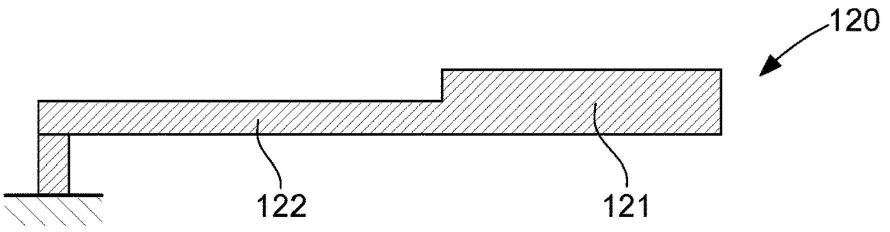
FIG. 3 schematically shows a cross-sectional view of the striking device of the striking mechanism of FIG. 1 or 2.

As schematically shown in FIGS. 1 to 3, the strips 122 extend between two longitudinal ends. Each strip 122 is therefore mechanically connected, by one of its longitudinal ends, to the structure of the horological movement, and by its other longitudinal end, to the hammer 121. In other words, the striking device 120 is fixed to the structure of the horological movement only by a mechanical connection of the setting type, that is to say that the strips 122 constitute the sole mechanical connection between the hammer 121 and the structure.

In particular, each strip 122 can be fixed to the structure of the horological movement by welding, screwing, gluing, tightened adjustment, or by any other means adapted to the capabilities of the person skilled in the art.

The strips 122 are both arranged so as to extend in directions intersecting at a point C materialising an instantaneous centre of rotation disposed about an axis T tangent to the vibrating element 11, as shown in FIG. 1. More specifically, the axis T is tangent to the vibrating element 11 at a point intended to be subjected to the impact of the hammer 121, that is to say at the striking point of the hammer 121, as shown in the figures. Thus, the hammer 121 is driven in movement in a direction D perpendicular to the axis T, or in a direction tangent to a direction D perpendicular to the axis T.

This feature has a plurality of advantages.

Indeed, this feature makes it possible to maximise the normal component of the forces applied by the hammer 121 on the vibrating element 11 during the percussion, or even to eliminate any tangential component. Thus, the percussion is more effective in terms of forces transmitted to the vibrating element 11 for given elastic features of the strips 122, which generates a higher sound volume produced by said percussion.

Moreover, this feature makes it possible to better control the position of the striking point of the hammer 121 on the surface of the vibrating element 11, and thus makes it possible to better control the vibration reaction of said vibrating element 11 and therefore of the sound effect produced during the percussion. More specifically, the sound effect produced during the percussion is different depending on whether the striking point is located on a vibration node or antinode of a vibration mode of the vibrating element 11.

Finally, the use of a flexible guide and its particular arrangement makes it possible to reduce the size of the striking device 120 and to considerably reduce the number of parts constituting said device insofar as said flexible guide plays both a pivot role and an elastic return role.

It should be noted that the striking device 120 may include more than two elastic strips 122 arranged so as to extend in directions intersecting at the same point C along the axis T. This feature makes it possible to increase the impact force of the hammer 121 on the vibrating element, for a given travel.

Alternatively or in addition, at least one strip 122 may be arranged so that the direction in which it extends does not pass through the point C. In particular, as shown in FIG. 2, it can be envisaged that the striking device 120 includes strips 122 arranged so as to form a plurality of groups of strips 122 in each of which the strips 122 extend in directions intersecting at an intersection point along the axis T, the intersection points of the directions of the strips 122 of each group being different from one another. This feature makes it possible to increase the travel of the hammer 121.

Preferably, the striking device 120 is one piece. Thus, the striking device 120 is particularly simple to produce, and its manufacturing cost is limited. Furthermore, the mechanism is not likely to suffer a loss of power during the percussion related to possible mechanical plays that could exist if the striking device 120 was designed by assembling various parts.

In particular, the striking device 120 may be made of amorphous metal, for example by moulding or hot forming, or of nickel or phosphorous nickel, for example by a LIGA method.

Alternatively, the striking device 120, and in particular the strips 122, may be made of silicon, for example by dry etching, and more particularly by Deep Reactive Ion Etching, a manufacturing method known as such by the person skilled in the art under the acronym DRIE. The strips 122 may, also alternatively, be made of steel, and formed by laser machining, in particular by femtosecond laser, or by electroerosion.

In particular, the hammer 121 may include one or more weights made of a metal material, for example of tungsten or of steel, to which the strips 122 are fixed by driving, gluing, by screw or pin.

Advantageously, the strips 122 have a thickness thinner than that of the hammer 121, such as seen in the sectional schematic view of FIG. 3. This feature makes it possible to increase the weight of the hammer 121 relative to that of the strips 122, and therefore to increase the energy provided by the latter during the percussion against the vibrating element 11.

It should be noted that the thickness is defined as being the dimension extending in a direction perpendicular to a plane wherein the striking device 120 and the vibrating element 11 are movable.

More generally, it should be noted that the implementations and embodiments considered above have been described by way of non-limiting examples, and that other alternatives are consequently possible.

In particular, the hammer has a trapezoidal shape in the examples of embodiments shown in FIGS. 1 and 2, but it may alternatively have any shape appropriate for achieving the percussion.

Furthermore, in the examples of embodiments shown in FIGS. 1 and 2, the vibrating element 11 is formed by a gong comprising a strand extending in a circular direction inside of which the striking device 120 is arranged. Alternatively, the striking device 120 could be arranged outside of the strand of the gong.

Moreover, the vibrating element 11 can adopt any suitable shape enabling it to vibrate following a percussion of a hammer and to generate a sound by vibrating, such as a bell or a gong.

The invention claimed is:

1. A horological movement of a watch, the horological movement comprising:

a striking mechanism including a vibrating element and a striking device of said vibrating element, wherein the striking device includes a hammer fixed overhanging a structure of the horological movement by means of at least two elastic strips forming a flexible guide, wherein said strips are both arranged so as to extend in directions intersecting at a point C disposed along an axis T tangent to the vibrating element at a point intended to be subjected to the impact of the hammer, the hammer configured to be driven in movement in a direction D perpendicular to the axis T, or in a direction tangent to a direction D perpendicular to the axis T, and wherein the at least two elastic strips are connected to the hammer on a same side of the hammer.

2. The horological movement according to claim 1, wherein the striking device includes at least one elastic strip, of the at least two elastic strips, arranged so that the direction in which the at least one elastic strip extends does not pass through the point C.

3. The horological movement according to claim 2, wherein the at least two elastic strips form a plurality of groups of strips, wherein each group of strips extends in a direction intersecting at an intersection point along the axis T, and wherein said intersection point of each group is different from one another.

4. The horological movement according to claim 1, wherein the striking device is fixed to the structure of the horological movement only by a mechanical connection of a setting type.

5. The horological movement according to claim 1, wherein at least the strips are made of silicon, by deep reactive ion etching.

6. The horological movement according to claim 1, wherein at least the strips are made by femtosecond laser, or by electroerosion.

7. The horological movement according to claim 1, wherein the striking device is one piece.

8. The horological movement according to claim 7, wherein the striking device is made of amorphous metal, by moulding or by hot forming.

9. The horological movement according to claim 7, wherein the striking device is made of nickel or of phosphorus nickel, by a LIGA method.

10. The horological movement according to claim 1, wherein the strips have a thickness thinner than that of the hammer.

* * * * *